Dec. 27, 1966   P. J. HEISTER   3,293,928
PULSATING TORQUE CONVERTER
Filed Aug. 25, 1964   7 Sheets-Sheet 1

INVENTOR.
PAUL J. HEISTER
BY
ATTORNEY

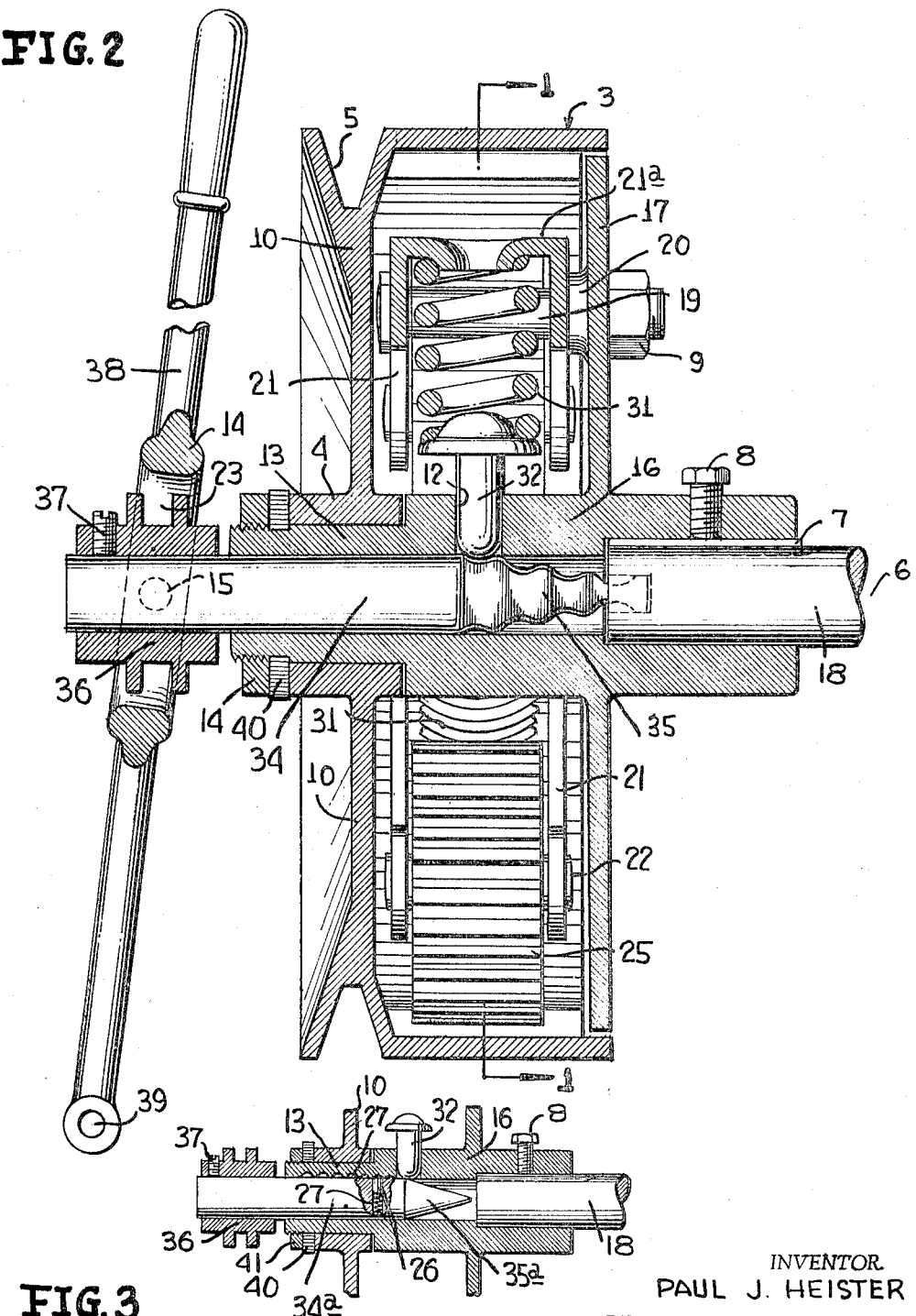

INVENTOR.
PAUL J. HEISTER
ATTORNEY

Dec. 27, 1966    P. J. HEISTER    3,293,928
PULSATING TORQUE CONVERTER
Filed Aug. 25, 1964    7 Sheets-Sheet 4

INVENTOR.
PAUL J. HEISTER
BY
ATTORNEY

Dec. 27, 1966     P. J. HEISTER     3,293,928
PULSATING TORQUE CONVERTER

Filed Aug. 25, 1964     7 Sheets-Sheet 5

INVENTOR.
PAUL J. HEISTER
BY
ATTORNEY

Dec. 27, 1966  P. J. HEISTER  3,293,928
PULSATING TORQUE CONVERTER

Filed Aug. 25, 1964  7 Sheets-Sheet 6

INVENTOR.
PAUL J. HEISTER
BY
ATTORNEY

INVENTOR.
PAUL J. HEISTER

United States Patent Office 3,293,928
Patented Dec. 27, 1966

3,293,928
PULSATING TORQUE CONVERTER
Paul J. Heister, Oxford, Md., assignor of one-half to Claire C. Heister
Filed Aug. 25, 1964, Ser. No. 391,995
12 Claims. (Cl. 74—64)

In my prior copending application, Serial No. 293,964, filed July 10, 1963, now Patent No. 3,181,377 for Pulsating Torque Converter, I have disclosed a mechanism including a drive shaft having affixed coaxially thereof, a cam member having a surface formed or generated by rotating a line of fixed length about and parallel with the axis of the shaft while gradually increasing and then decreasing, between predetermined minimum and maximum limits, the radial distances of the line from the axis of the shaft. Each increase and sequential decrease constitutes a cycle so that for example, if there are three such cycles, each extends through an angle of 120° about the axis of the shaft and there will be three high points interspersed by three "low" points of the same surface.

A drive shaft is mounted coaxially of and adjacent an end of the driving shaft. This driven shaft includes a plate contiguous the cam surface and bearing a predetermined number of arms each pivoted at one end to the plate, at a respective one of an equal number of points equiangularly spaced about the common axis of the driving and driven shafts. The other end of each arm mounts a roller and means are provided to urge each arm into pivotal movement such that its roller will engage the aforesaid cam surface with variable force. As disclosed in my aforesaid application, where the cam surface embodies three cycles, there will preferably be four arms and four equiangularly-spaced rollers carried by the plate, with means such as a controlled source of hydraulic pressure fluid to simultaneously urge all rollers into contact with the cam surface. At non-synchronous speeds the rollers roll over the cam surface at rates dependent upon the difference in speeds between the driving and driven shafts, but as the speeds become synchronous, one of the rollers "locks" in a radially-outwardmost "depression" in the cam surface so that thereafter the driving and driven shafts operate as a unit. However, due to the impositive coupling embodied in the cam surface and rollers, it is impossible to overload the converter and, depending on the torque-speed or power available from the driven shaft, the speed of the driven element may be widely varied as desired from zero to synchronous.

The present invention is an improvement over the drive disclosed in my aforesaid prior copending application.

It is the chief object of the present invention to provide a torque converter operating on the same principle as that disclosed in the prior application but which has a more positive action.

Another object is to provide a converter of the type involved which reduces the possibility of undesired slippage between the driving and driven shafts.

Still another object is to afford a converter of the type described and which is of particular utility in driving machines that operate in a number of different speed and power ranges, such as lathes and drill presses.

Yet another object is to provide a converter as described, which, because of elimination of possible slippage, will operate positively and reliably over a very long period of useful life.

Other objects and advantages of my invention will become clear to those skilled in the art after a study of the following detailed description, in connection with the accompanying drawing.

In the drawing:

FIGURE 2 is a section taken in planes indicated and identified by the broken line 2—2, FIGURE 1;

FIGURE 3 is a detail axial section of a modified form of control of the instrument;

Figure 1:
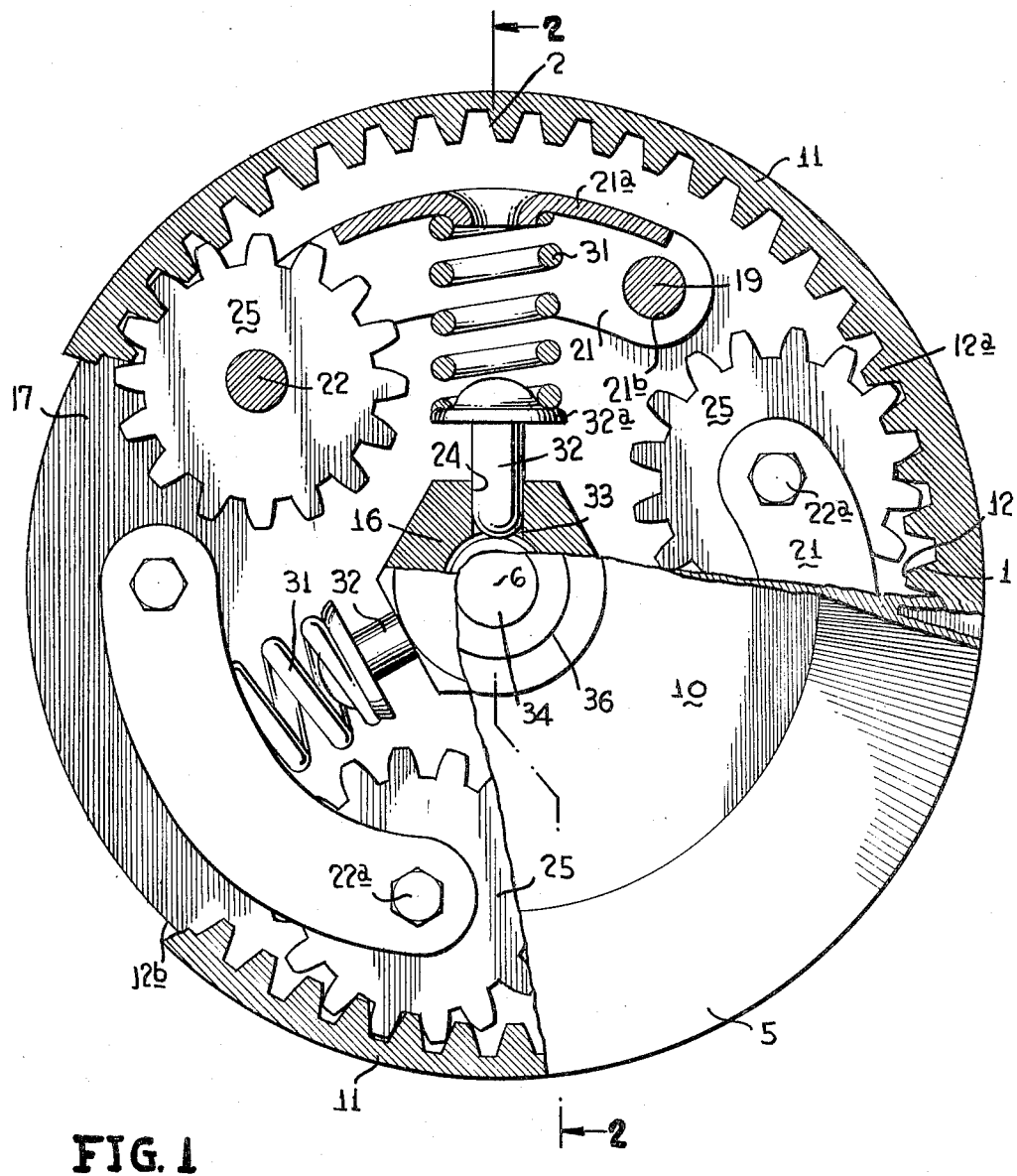
FIGURE 1 is a section taken on a plane identified by line 1—1, FIGURE 2, a part of the combined gear-pulley element being shown in elevation.
Figure 4:
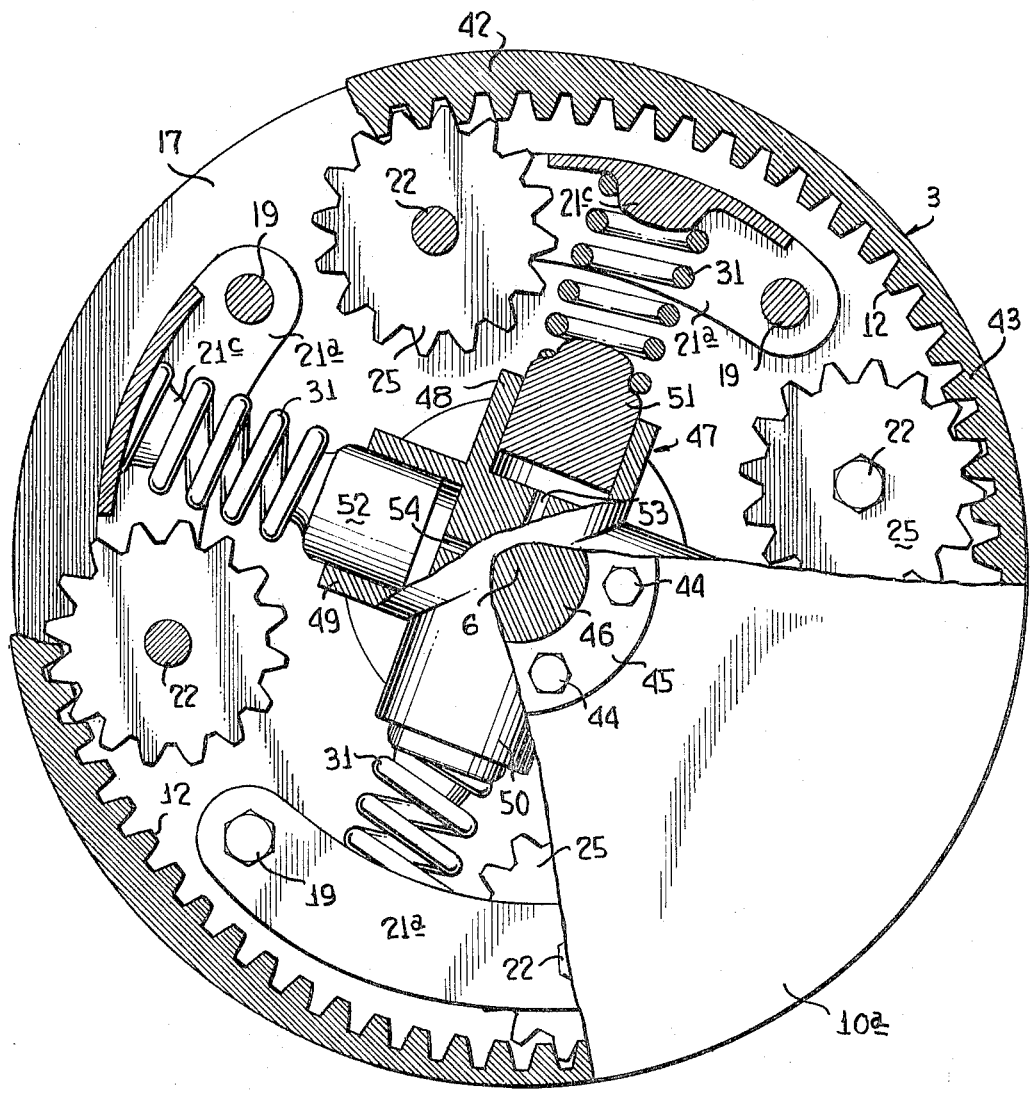
Figure 5:
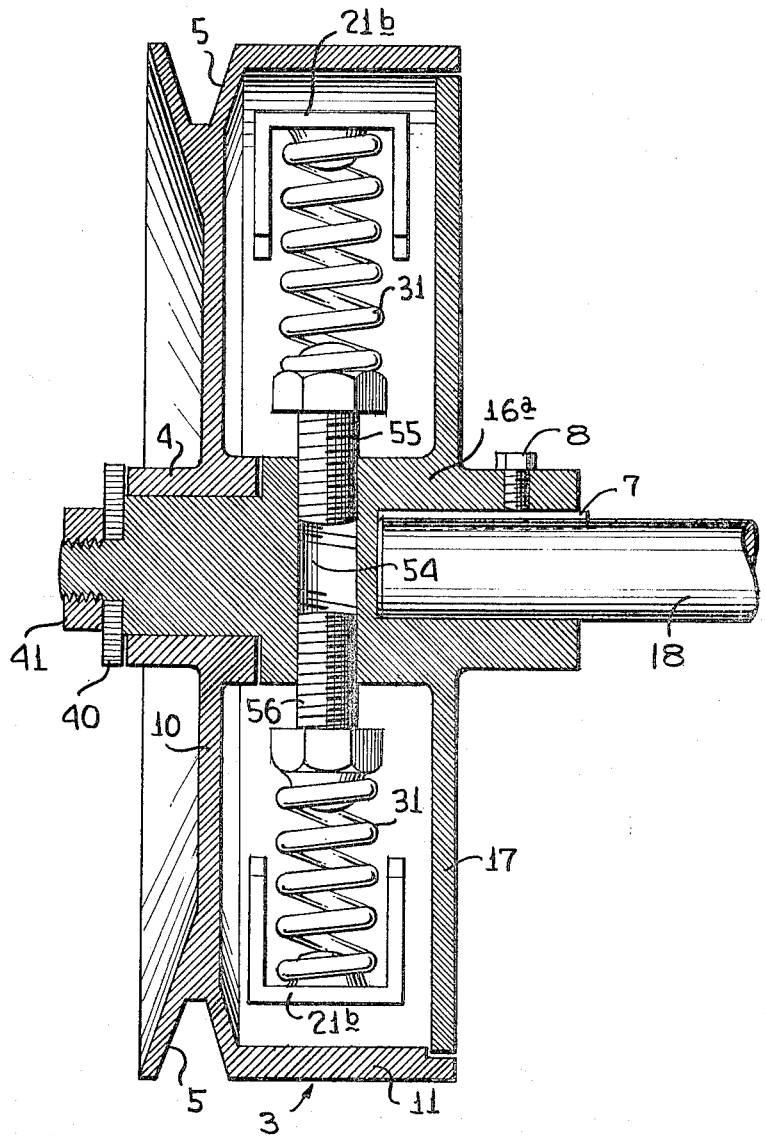

FIGURE 4 corresponds generally to FIGURE 1 but shows a modification involving the use of pressure fluid to effect control;

FIGURE 5 is an axial section through a modification in which different means are used for varying the speed-torque characteristic of the instrument.

Figure 6:
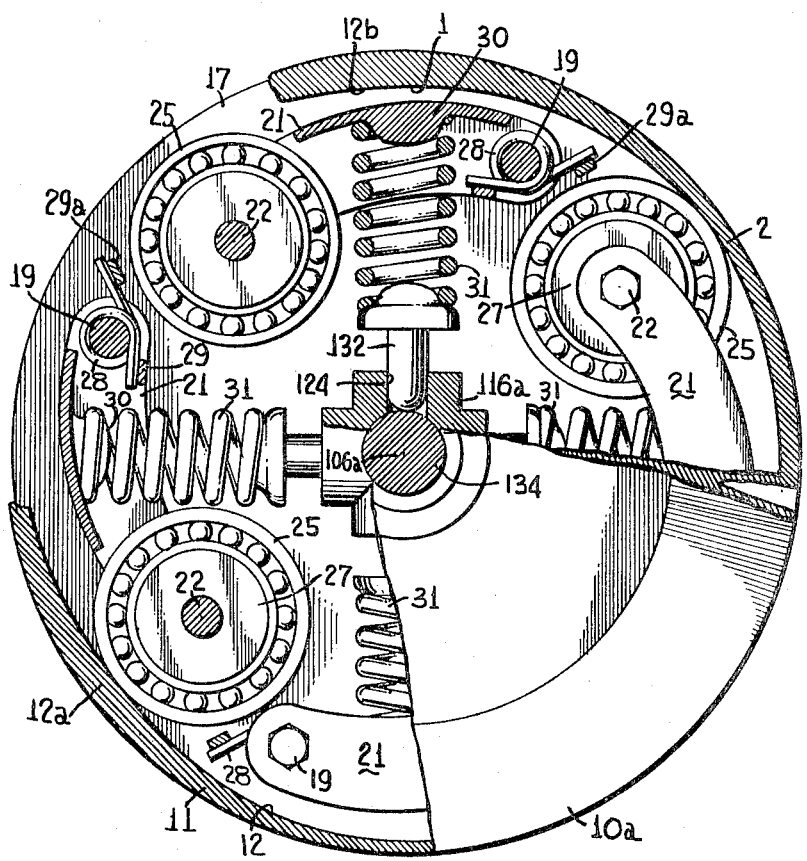

FIGURE 6 is an elevational view, partly in section, showing another modification of FIGURE 1, with cam surfaces and cam followers substituted for the spur gear and internal gear of FIGURE 1.

Figure 7:
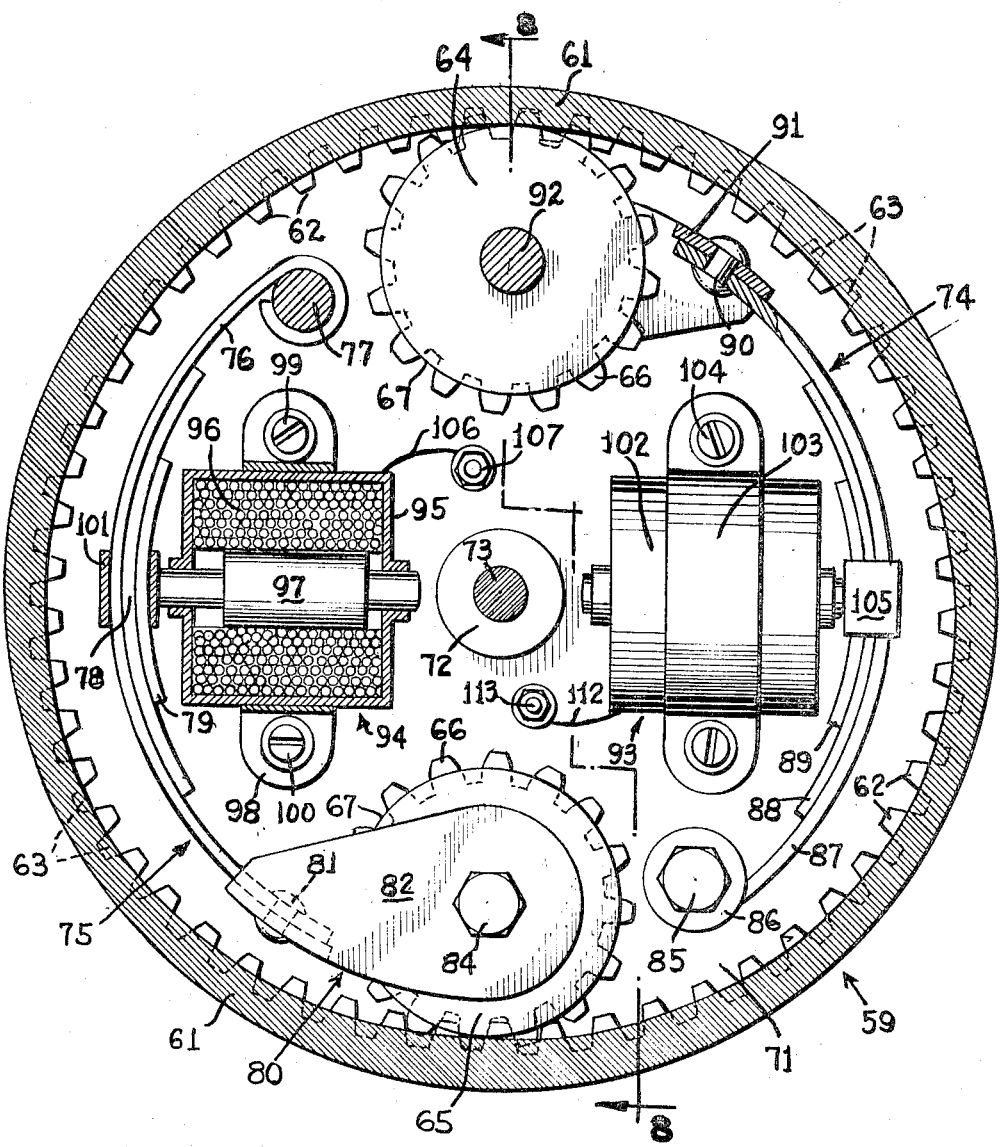
Figure 8:
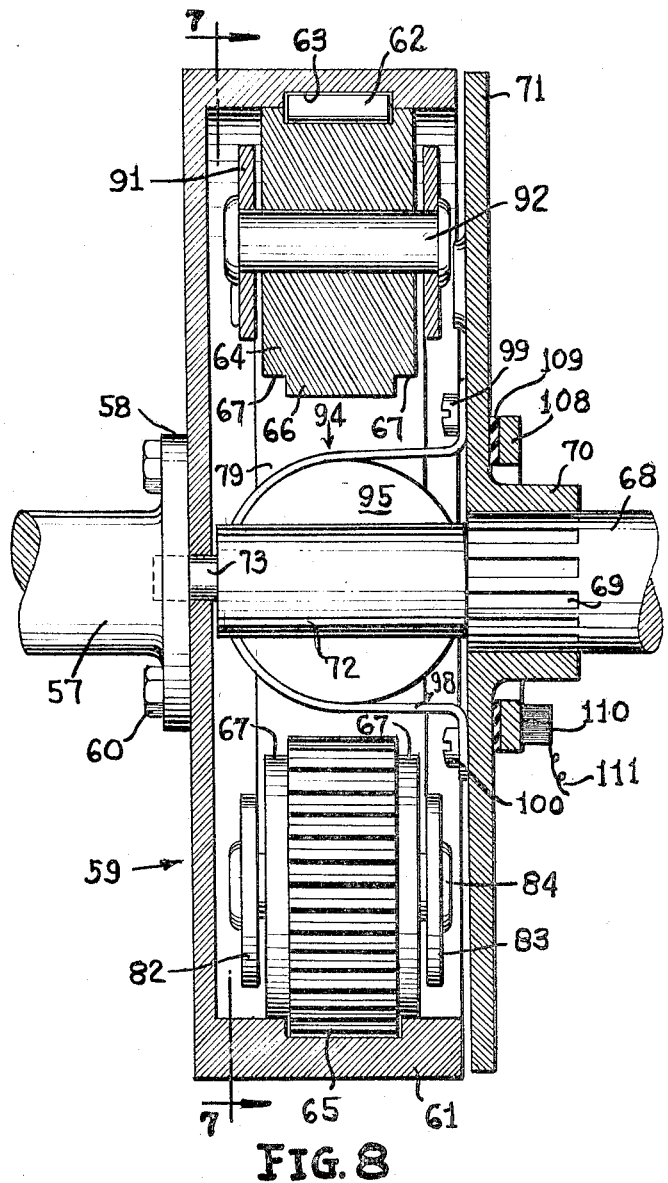

FIGURE 7 is a sectional view of still another modification taken in a plane identified by 7—7, FIGURE 8; and FIGURE 8 is a sectional view of the same modification, taken in planes identified by the broken line 8—8, FIGURE 7.

Referring in detail to the drawing, and particularly to FIGURES 1 and 2, a driving element or pulley, generally identified at 3, FIGURE 2, consists of a hub 4 having an integral circular disk 10 with rim portion 5 channeled to receive a V-belt. A flange 11 extends axially from the periphery of one side wall forming the groove. The outer surface of the flange may conveniently be cylindrical about the axis of hub 4. The inner surface of the flange is formed as an internal gear 12 having teeth 2. The teeth are formed along a pitch line which is not truly circular. To the contrary, this pitch line is generated by rotating, in a plane normal to the axis of hub 4, a point whose radial distance from the aforesaid axis varies uniformly between a maximum at 2 to a minimum at 1, to define what may be termed "lobes" or "cycles." Thus in the model shown upon FIGURES 1 and 2, there are two of these lobes each of the 180° angular extent about the axis 6. Considering a horizontal line, FIGURE 1, drawn through axis 6, the first lobe extends from a first point generally considered with the intersection of this line at a second point, with flange 11 at the left, clockwise 180° to its intersection with the flange at the right of the figure. The second lobe extends from the aforesaid second point 180° clockwise to the first point.

The teeth which may be of conventional involute form are, of course, uniformly spaced along the pitch line. Thus, the pitch line of the gear has two "high" points 2 and two "low" points 1 with each high point lying at 90° angular spacing from and between two low points.

Although for convenience of illustration the hub 4, disc 10 and flange 11 are shown as a single integral part, these may be formed separately and rigidly connected together in any suitable way. Also the number of such lobes in any given installation may be three or more each of the same angular extent about axis 6.

The driven element includes a hub 16 which as shown upon FIGURE 1, may be hexagonal in cross section. At its left end as viewed upon FIGURE 2, the hub has a cylindrical reduction 13 size or a smooth fit within the bore of hub 4. A washer 40 fits over the end of the reduction 13, and a nut 41 is threaded thereon to prevent axial play of the hub while permitting free rotation of the hub on the reduction. The right end hub 16 is counterbored to receive the end of a driven shaft 18 and which is secured for rotation as a unit with the hub, as by means of a key 7 locked in place by set screw 8, radially threaded through the hub.

A circular plate or disc 17 is shown as formed integrally with hub 16 to lie in a plane normal to axis 6.

This plate has four equiangularly-spaced lugs 20, each centrally drilled parallel with the axis 6, to receive with a snug or pressed fit, a respective one of four stub shafts 19. If desired, the ends of these shafts may protrude outwardly of plate 17 and threaded to receive lock nuts 9. The inner or left ends of these shafts as seen upon FIGURE 2, terminate short of disc 10.

Three rocker arms 21 are provided. Each rocker arm is accurate and in the cross sectional form of a U-shaped channel. The base for bight portion of one of these channels is identified at 21a, FIGURE 1, from which it is noted that this portion is cut away or stops short of the ends of the arm to leave projecting side walls.

While still referring to FIGURE 1, the side walls at one end of the arm are pierced with aligned holes such as 21b to fit smoothly over a respective shaft 19, so that each arm may oscillate freely about the axis of its shaft.

At its other end each arm has a shaft 22 fixed in and between its side walls. A pinion 25 is journalled on each shaft between the side walls of its arm. The aforesaid bight portion of each arm is pierced and inwardly upset to define a seat for one end of a radially disposed compression coil spring 31.

The hub 16 previously described, has three radial, equiangularly-spaced holes 12. A pin 32 slidably fits each hole. The inner end of these pins are rounded while the radially outward ends 32a thereof are shaped to fit within the inner end of the respective one of the springs 31. Thus when pins 32 are forced radially outwardly, they act to compress the springs and to urge each arm into rotation to force the pinion with variable force into engagement with the internal gear. All three of the arms 21, its mounting on plate 17, springs 31 and pins 32, are duplicates.

Means for controlling the radial positions of all pins 32 are shown in the form of a shaft or plunger 34 having a smooth fit within the bore of hub 16. At its left end as seen in FIGURE 2, the shaft is fitted with a collar 36 secured thereto by set screw 37, and having axially spaced flanges defining a circumferential channel 23 between them. A lever 38 pivoted at one end at 39 to any convenient part of the machine, has an integral ring 14 encircling the collar and radial pins such as that indicated at 15, FIGURE 2, fixed with the ring at diametrically opposite points. The radially inward ends of these pins slidably fit within channel 23 so that, in an obvious way, pivoting of lever 38 acts to actually translate shaft 34 within its bore in hub 16.

The inner end 35 of shaft 34 is tapered to form a generally conical surface formed with circumferential grooves of progressively decreasing ratio outwardly of the shaft. The construction and arrangement are such that by actuation of handle 38, each groove of shaft 34 may be moved into the contact with the rounded inner ends of pins 32, to thereby selectively vary the force with which springs 31 urge the pinions into contact with the internal gear. Each groove is so formed that when the ends of the pins engage therein shaft 34 is thereby held in its position of axial adjustment until again moved by operation of lever 38. When lever 38 is pulled out or rotated to its limiting position counterclockwise viewed upon FIGURE 2, the groove in shaft 34 of minimum radius, is in contact with pins 32. In this position of adjustment the pins are in their radially intermost position with respect to axis 6 and there is substantially no tension in springs 31. Thus as power is applied to pulley 3 from a source driving a V-belt fitting rim portion 5, shaft 6 remains at rest and pinions 25 simply idle as the internal gear rotates about them. It is to be noted, however, that under such conditions, due to the particular form of the gear as previously described, the pinion and arms oscillate about their shafts 19 through a small angle.

A shaft 34 is shifted to the right, FIGURE 2, pins 32 are progressively cammed outwardly as they ride into grooves in the shaft, of increasing radii. This action tentions springs 31 to urge the pinions with increasing force into mesh with the internal gear. As each pinion passes from a "high" or radially outwardmost position with respect to axis 6, to a "low" or radially inwardmost position, against the urge of its spring 31, an impulse is applied to the pinion which is converted by the invention with an increment of torque about axis 6. Considering the situation where shaft 18 is at rest, there will, in the model illustrated, be six of these impulses for each 360° rotation of pulley 3. That is to say, where the number of lobes of the internal gear is different from the number of pinions, the number of impulses under the conditions stated, will be equal to the number of lobes multiplied by the number of pinions.

As the tension of springs 31 is gradually increased, the torque, created by each aforesaid impulse correspondingly increases. Shaft 18 picks up speed and when shaft 34 is advanced to its maximum inward position shown upon FIGURE 2, one of the pinions "locks" at a high point of the gear and shaft 18 rotates at synchronous speed with pulley 3, in such condition the pinions do not rotate but merely revolve about axis 6.

It is impossible to overload the converter. For example, if shaft 18 encounters excessive load or resistance, the pinion will begin slowly at first, to roll about and relatively to gear 12. The rate of rotation of the pinion will increase with excessive load so that the torque-speed characteristic of the driven shaft will under the conditions noted, remain essentially constant. It is also to be noted that as the rate of revolution of pinion 25 about axis 6 increases, the centrifugal force acting upon them correspondingly increases and aids the thrust of springs 31 in forcing the pinions into engagement with the gear.

Thus the invention provides a highly useful drive for machine tools such as lathes and drill presses. In each installation by proper adjustment and proportioning of the parts, the precise speed of shaft 18 for the work being done, may be selected to give optimum rates of cutting, drilling, boring, reaming, polishing, etc. This speed will be determined in any given installation, by the adjustment of shaft 34 axially within its bore in hub 16.

In FIGURE 3, I have shown a modified form of mechanism for adjusting the thrust of springs 31. Since this form may embody numerous parts identical with those of the species of FIGURES 1 and 2, it will be sufficient to identify hub 16, disc 10, shaft 18 and pin 32, only one of which is shown. However, unlike the species of FIGURES 1 and 2, shaft 34a has a plain conical end 35a. A lug or ball 26 fits within a radial hole in the shaft and is urged outwardly by a spring 27 within the hole. This lug is adapted to seat within any selected one of a longitudinal row of spaced notches 27 to thereby releasibly hold a corresponding radius of conical end 35a in coplanar relation with the pins 32, since shaft 34a may be axially shifted by the same mechanism that has been described in connection with FIGURES 1 and 2, only collar 36 and its set screw 37 have been shown. If preferred notches 27 may be formed in shaft 34a and lug 26 located within a radial hole in reduced end 13 of hub 16. It is intended that shafts 34 or 34a, as the case may be, will rotate with hub 16. This is not absolutely necessary, however, and in certain models it may be preferable to maintain these shafts stationary, in which event, pins 32 will rotate in contact with the tapered end of the shafts during operation. The operation of this species is the same as that of FIGURES 1 and 2 and need not be repeated.

In FIGURE 4 I have shown a third modification wherein the parts are mainly the same as those depicted upon FIGURES 1 and 2, so that it is sufficient to identify pulley 3 with its internal gear 12, plate 17, shafts 19, arms 21a, shafts 22, pinions 25, and springs 31. However, the following differences are noted: (a) there are four arms and pinion assemblies instead of three as in FIGURES 1 and 2; (b) the internal gear has three "lobes" each of 120° angular extent; (c) each arm 21a, instead of being pierced and upset to form a lug receiving the contiguous end of its spring, has a solid lug 21c for this purpose. Elucidating (b) supra, a "low" point of one lobe occurs about as indicated at 42, FIGURE 4 followed clockwise, by a "high" point at 43, 60° from point 42. Another "low" point will be spaced 60° clockwise from point 43 and so on, to provide the three lobes mentioned. Thus, with the driven shaft at rest, there will be 12 impulses of torque applied thereto, for each full rotation of the driving pulley or shaft.

While the pulley shown at 3, FIGURES 1 and 2 may be duplicated in the species of FIGURE 4, I have shown this as a simple cup-like element with disc 10a having a flanged or skirted rim with the internal gear teeth cut therein on and along the aforesaid undulating pitch line. The disc is attached by cap screws 44 to the flanged end 45 of driving shaft 46.

The hub 16 of FIGURE 2 is replaced in the species of FIGURE 4, by a block generally identified at 47 and having formed therewith four equiangularly-spaced cylinders 48, 49, 50, etc. whose axis lie in a common plane normal to the axis of rotation 6. Pistons 51, 52, etc. each slidably fit a respective cylinder. Each piston has its radially outward end formed as a lug fitting the inward end of a respective spring 31, block 47 is formed with a central axial passageway connected in any suitable way with a source of pressure fluid not shown. Four radial passageways two of which are identified at 53, 54 each lead from the aforesaid central passageway to a respective one of the cylinders. Thus as fluid under pressure is admitted to the passageway under control of valve means, not shown, the pistons are simultaneously forced outwardly to thereby increase the radial forces on the arms 21a and, correspondingly, the force with which each pinion 25 engages the internal gear. The function and manner of operation are the same as in the species of FIGURES 1 and 2 as previously described, with the principal difference that the aforesaid valve means is the functional equivalent of handle 38, in controlling the amount of power which the converter will transmit for any given adjustment.

FIGURE 5 shows a simplified version of my torque converter. In this form, the hub 16a and plate 17 may be of the same form as in FIGURES 1 and 2 and are therefore given the same reference numerals. Likewise, it is sufficient to identify driven shaft, key 7, set screw 8; pulley 3 may be identical with that shown upon FIGURE 2 including hub 4, disc 10, rim and belt groove 5, and flange or skirt 11. Since the internal gear of flange 11 may be identical with that of FIGURES 1 and 2, the teeth thereof have not been shown upon FIGURE 5. In the model being described, hub 16a may be square in cross section and with mutually normal intersecting tapped holes opening through the faces of the square. One of these holes is identified at 54, four cap screws of which two, 55, 56, only are shown are threaded into these holes. The heads of the screws are shaped to fit the contiguous ends of springs 31 which act in the manner previously described, to urge the respective arms 21b radially outwardly and urge each pinion, not shown, with variable force, into contact with the internal gear. Of course, each screw 55, 56, etc., is so adjusted that each of the four springs exerts substantially the same radial force as the others.

The form shown upon FIGURE 5 is simpler and less expensive to construct than are those of FIGURES 1, 2 and 4, and is adequate in cases where the maximum power to be transmitted is essentially constant under all conditions of use, that is, where the torque-speed characteristic of the machine to be driven does not vary materially. When a different torque-speed characteristic is required, it is a relatively simple matter to remove pulley assembly 3 and individually adjust all screws such as 55 to the same extent.

In all species the teeth of the internal gear and pinion may be straight or helical, as desired.

In the species shown upon FIGURES 7 and 8, a drive shaft 57 has a flanged end 58 connected with flanged drawing element 59 by cap screws 60. The flange or skirt portion 61 is formed generally like that identified at 11, except that it has three "lobes" instead of two depicted upon FIGURE 1. Thus, from FIGURE 7 it is noted that starting with a "high" point at the top of the figure and continuing clockwise, the thickness of the flange increases gradually to a "low" point at 60°, thence to a second "high" point at 120°, a "low" point at 180° and so on to the starting points. The external surface of the flange is cylindrical.

Another difference is that each tooth 62 of the internal gear is formed, in part by a radially inward projection from the lobed surface of the drawing element and in part by a pair of contiguous depressions 62 formed in said surface. Thus the pitch line of the teeth lies approximately in and follows the contour of the lobed surface. As noted from FIGURE 8, the depressions 63 are of shorter length than the axial dimension of flange 61 and are approximately centered with respect thereto.

In the model shown, there are two duplicate pinions 64 and 65. The root portion of each tooth of these pinions is formed by a pair of contiguous axially-extending depressions or troughs 63 in the cylindrical surface of the hub of the pinion, while its tip portions is formed by a radial projection 66 lying between two troughs. The surfaces of the troughs and projections conjointly define a tooth of smooth uniform profile which may be of usual involute form. Since, as is seen in FIGURE 8, these projections are shorter than the axial dimension of the cvylindrical blank from which each pinion is formed, tracks 67 are defined at each side of the teeth. As is clear from inspection of FIGURES 7 and 8, the axial dimensions of the troughs and projections of the internal gear and pinions are such that they have a smooth interfit substantially without axial play. Further, the dimensions are such that the aforesaid tracks 67 of the pinions have rolling contact with the lobed surface of the flange 61, as is particularly clearly shown upon FIGURE 8.

By the continuation described, intermeshing of the pinions with the gear acts to maintain the pinions against axial play. Furthermore, the rolling contact between tracks 67 and the undulating or lobed inner surface of the gear limits and maintains constant the depth of mesh between the gear and pinions, prevents bouncing and chatter of the pinions, increases the impulse or torque applied to the driven shaft as each pinion passes from a "high" or radially outwardmost position to a "low" or radially inwardmost position with respect to the internal gear and in general provides smooth efficient performance.

The driven shaft is identified at 68, FIGURE 8, and is formed with a splined portion 69 fitting the internally splined hub 70 of driven element or disc 71. As noted from FIGURE 8 this disc is circular and has a diameter sufficient to extend over the contiguous edge of flange 61 and thus enclose the operating parts of the instrument. Preferably, but not necessarily shaft 68 has a reduced end 72 followed by a further reduced axial tip 73 fitting aligned central holes in the disc of drawing element 59 and flange 58.

Pinions 64 and 65 are carried by driven disc 71 through means including a pair of duplicate leaf spring assemblies generally identified at 74 and 75, FIGURE 7. Confining attention to assembly 75, one end of a leaf spring 76 is curled to fit smoothly about a headed anchor pin 77 whose end may be threaded into or welded in an aperture in disc 71. As shown this spring is stiffened by a pair of auxiliary leaves 78 and 79. It is contemplated however, that these auxiliary leaves may be dispensed with in certain installations not requiring the additional spring stiffness afforded thereby.

At its other end, spring 76 has a bearing yoke 80 fixed therewith as by a rivet 81 extending through aligned holes in the spring and the bight portion of the yoke. The yoke is formed from a single blank of heavy sheet metal bent to form parallel sides 82, 83, FIGURE 8, extending from opposite ends of the aforesaid bight portion. A bearing pin 84 extends through aligned holes in sides 82, 83 of the yoke. As shown upon FIGURE 8 this pin may have both ends headed.

Pinion 65 is journaled on pin 84 and fits smoothly between the sides of the yoke. Since spring assembly 74 may be a duplicate of assembly 75, just described, it is sufficient to identify anchor pin 85, FIGURE 7, washer 86 interposed between the hexagonal head of the pin and the curled end of spring 87, auxiliary leaves 88, 89, rivet 90 securing bearing yoke 91, and bearing pin 92 on which pinion 64 is journaled.

Each pinion 64, 65 is urged with variable force into mesh with the internal ear, by respective ones of a pair of duplicate electromagnets generally identified at 93, 94. Electromagnet 94 best shown upon FIGURE 7 comprises a metallic casing 95 enclosing winding or solenoid 96 and having aligned flanged contact apertures in its ends mounting the reduced ends of armature 97 for reciprocation. Casing 95 is fixed to disc 71 by a strap 98 which extends about the casing and has its ends anchored to the disc by screws 99, 100. If desired the strap may be fixed to the casing as by welding or soldering.

The reduced radially outward end of armature or plunger 97 is formed with a yoke or clasp 101, encircling the central portion of the assembled spring leaves 76, 78, 79 so that as response 6 energization of the electromagnet the armature is urged to the left as viewed upon FIGURE 7 to thereby flex the spring and to correspondingly increase the force with which pinion 65 is urged into contact with the internal gear.

Since electromagnet 93, its mounting and attachment to spring 94 are the same as just described for electromagnet 94, it will be sufficient to identify its casing 102, holding strap 103, screws 104, and yoke 105 encircling spring assembly 74.

One lead 106 from solenoid 96 extends to a terminal post 107 which extends through an insulating bushing in disc 71, to the outer side thereof. Referring to FIGURE 8, a slip ring 108 is mounted to disc 71 coaxially thereof. An insulating ring 109 is interposed between the slip ring and disc. Post 107 previously described makes electrical connection with ring 108. A fixed brush 110 contacts ring 108 and is connected with lead 111.

The other lead from solenoid 96 is grounded so that the solenoid may be energized by a voltage exerted between lead 111 and ground. Similarly the solenoid of electromagnet 93 is energized by a lead 112 extending to an insulated terminal post 113 passing through disc 71 and connected with slip ring 108. The exterior ends of posts 107 and 113 may be integrally fixed with ring 108, to hold both rings to disc 71 when nuts on the inner ends of the posts are turned down.

The voltage applied to lead 111 and thence to the electromagnets may be varied manually as by an adjustable rheostat, not shown, in the circuit from lead 111, to correspondingly vary the face with which the electromagnets urge the respective pinions into engagement with the internal gear. Preferably, however, the energization of electromagnets 93, 94 could be varied automatically. For example, a speed-responsive device may be driven from shaft 68 and, in turn, operate to adjust a rheostat in the circuit from lead 111, so that the electromagnets will be energized in proportion to the speed of the output shaft.

Alternatively a torsionmeter of known type may be inserted in or between two sections of shaft 68 so that the sections have a relative angular displacement or twist proportional to the power being transmitted. This displacement may then be utilized to control or adjust a rheostat in the circuit of lead 111.

Many other modifications and manner of uses of the species of FIGURES 7 and 8 will be apparent to those skilled in the art after a study of the disclosure.

Having fully disclosed the invention, what I claim and desire to secure by Letters Patent is:

1. A torque converter comprising, a driving pulley rotatable about an axis and including a skirt portion symmetrical about said axis, an internal gear formed on the internal surface of said skirt portion, said gear having a pitch line defined by the rotation at uniform angular rate about said axis of a point, while cyclically and uniformly varying the radial distance of said point from said axis between predetermined maximum and minimum limits, to define a plurality of equiangularly-spaced lobes, the teeth of said gear being uniformly spaced along said pitch line, an integrally connected hub and plate rotatable on said axis, a plurality of pinions, means mounting said pinions individually on said plate in uniformly-spaced relation about said axis and for guided movement toward and from said gear, and means operable to urge said pinions with selective force into engagement with said gear, said hub having a bore in and along said axis and a plurality of radial holes opening into said bore, said last-named means comprising a plurality of pins each slidably fitting a respective one of said holes and a shaft fitting said bore for translation along said axis, said shaft having a tapered end for contact with the radially inward ends of said pins, and means engaging said shaft and selectively operable to axially translate the same.

2. In a torque converter, an integrally connected hub and plate symmetrical about an axis of rotation, pulley means journalled for rotation on said axis and including a skirt symmetrical about said axis, an internal gear formed on the internal surface of said skirt, said gear having a pitch line defined by the rotation at uniform angular rate about said axis, of a point, while cyclically and uniformly varying the radial distance of said point from said axis between predetermined maximum and minimum limits to define a plurality of equal loads, equiangularly-spaced about said axis, the teeth of said gear being uniformly spaced along said pitch line, a plurality of arms each pivoted at one end to said plate in equiangularly-spaced relation about said axis, a plurality of pinions, each journalled for rotation on the other end of a respective one of said arms for movement toward and from said gear, a plurality of springs each having a first end engaging a respective arm, and means carried by said hub and operable to simultaneously engage and stress said springs to urge said pinions with selectively variable force, into engagement with said gears.

3. The torque converter of claim 2, said pulley means being journalled on said rub.

4. The torque converter of claim 2, said hub having a bore along said axis and a plurality of equiangularly-spaced holes radially of said axis and opening into said bore, said last-named means comprising (a) a plurality of pins each fitting a respective one of said holes, and engaging a respective one of said springs, (b) a shaft axially slidable in and along said bore and having a conical portion engaging the radially inward end of all said pins, and (c) means engaging said shaft and operable to axially translate the same to variably stress said springs.

5. The torque converter of claim 2, said hub including a plurality of cylinders equiangularly-spaced about said axis-radially thereof, said last-named means comprising (a) a plurality of pistons each slidably fitting a respective one of said cylinders, and each engaging the radially inward end of a respective one of said springs, and (b) passageways in said hub for the simultaneous introduction of pressure fluid into the radially inward end of all said cylinders.

6. The torque converter of claim 2, said last-named comprising a plurality of screws threaded into said hub in equiangularly-spaced relation, radially of said axis, the radially-outward end of each said screw engaging a respective one of said springs to selectively and individually stress the same.

7. A torque converter comprising a driving disc having a central axis of rotation and a flange periphery having an internal surface generated by the rotation about said axis of a line parallel with said axis, while uniformly and cyclically varying the radial distance of said line from said axis, between predetermined maximum and minimum limits, to define an undulating lobe surface, gear teeth formed in said surface, about said axis, a driven element, a plurality of pinions, means journaling each said pinion for rotation on its axis and for movement toward and from said gear teeth, and electromagnetic means connected with said journaling means and energizable to urge said pinions with variable force into mesh with said gear teeth.

8. The converter of claim 7, and means operable automatically to energize said electromagnetic means in accordance with the power transmitted to said driven element.

9. The converter of claim 7, each said tooth of said gear and said pinions being of shorter axial dimension than said surface and pinions, each said tooth of said gear and pinions being formed in part by a contiguous pair of axial channels and an interposed axial projection, said teeth being constructed and arranged to permit a rolling contact between surfaces at the ends of said teeth of said pinion and said surface.

10. In a torque converter, a driving disc having a central axis of rotation and a circumferentially- and axially-extending peripheral flange, the internal surface of said flange being formed by the rotation about said axis, of a line parallel therewith, while uniformly and cyclically varying the separation of said line from said axis, between predetermined maximum and minimum limits, to define an undulating surface having a plurality of equiangularly-spaced lobes, and gear teeth formed in said surface, about said axis, each said tooth being formed partly by two consecutive spaced axial channels in said surface and a radial and axial projection interposed between and forming smooth faces with contiguous walls of said channels, a driven element, a plurality of pinions, means furnishing each said pinion for rotation on its axis and for independent movement toward and from said gear teeth, and means operable to urge each said pinion with variable force into mesh with said gear teeth, said last-named means comprising electromagnetic means engaging said journaling means, and exerting a thrust thereon in response to energization of said electromagnetic means.

11. The torque converter of claim 10, said journaling means comprising a plurality of leaf springs each pivoted at one end to said driven element, each said pinion being journaled on the other end of each respective spring, said electromagnetic means including a plunger connected with each said spring between the ends thereof.

12. In a torque converter, a driving disc having a central axis of rotation and a flanged periphery having an internal surface defined by the rotation about said axis of a line of fixed length parallel with said axis, while uniformly and cyclically varying the radial distance of said line from said axis, between predetermined minimum and maximum limits to define an undulating surface having a plurality of equiangularly-spaced lobes, a gear formed in said surface, the root portion of each tooth of said gear being formed by and between the walls of two contiguous axial depressions in said surface, the tip portion of each said tooth of said gear being formed by a projection whose surfaces are continuations of the respective walls of said depression, a plurality of pinions, a plurality of leaf springs, means pivoting each spring at one end thereof to said driven element, means journaling each said pinion on the other end of a respective one of said springs, and electromagnetic means carried by said driven element and connected with said spring to urge each said pinion with variable force into mesh with said gear.

References Cited by the Examiner

UNITED STATES PATENTS

| | | | |
|---|---|---|---|
| 463,977 | 11/1891 | Allen | 74—437 |
| 924,749 | 6/1909 | Drapier | 74—64 X |
| 1,703,061 | 2/1929 | Coleman | 74—64 |
| 1,970,251 | 8/1934 | Rossman | 74—801 |
| 2,167,276 | 7/1939 | Harmon et al. | 74—64 |
| 2,232,234 | 2/1941 | Hilliard | 74—64 |
| 2,366,637 | 1/1945 | Mejean et al. | 74—64 |
| 2,552,350 | 5/1951 | Smith | 74—56 |
| 2,881,602 | 4/1959 | Baker et al. | 64—29 |

FOREIGN PATENTS

| | | |
|---|---|---|
| 964,732 | 2/1950 | France. |
| 672,928 | 9/1929 | France. |

FRED C. MATTERN, Jr., *Primary Examiner.*

MILTON KAUFMAN, *Examiner.*

F. E. BAKER, *Assistant Examiner.*